US012297664B2

(12) United States Patent
Lehner, Jr. et al.

(10) Patent No.: US 12,297,664 B2
(45) Date of Patent: May 13, 2025

(54) EXIT DEVICE WITH REMOTE TRIM INPUT

(71) Applicant: Schlage Lock Company LLC, Carmel, IN (US)

(72) Inventors: Jack R. Lehner, Jr., Indianapolis, IN (US); Michael D. Coleman, Noblesville, IN (US); James W. Overbey, Indianapolis, IN (US); Phillip Palmer, Indianapolis, IN (US); Matthew Greathouse, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 17/724,114

(22) Filed: Apr. 19, 2022

(65) Prior Publication Data

US 2023/0031694 A1 Feb. 2, 2023

Related U.S. Application Data

(62) Division of application No. 16/051,646, filed on Aug. 1, 2018, now Pat. No. 11,306,512.

(51) Int. Cl.
*E05B 65/10* (2006.01)
*E05B 15/00* (2006.01)
(Continued)

(52) U.S. Cl.
CPC ...... *E05B 65/1013* (2013.01); *E05B 15/0026* (2013.01); *E05B 65/0007* (2013.01); *E05B 65/1053* (2013.01); *E05B 2009/046* (2013.01)

(58) Field of Classification Search
CPC ............. E05B 65/1013; E05B 15/0026; E05B 65/0007; E05B 65/1053; E05B 2009/046
See application file for complete search history.

(56) References Cited

U.S. PATENT DOCUMENTS 2,928,690 A * 3/1960 Larson .................... E05B 53/00 292/336.3
3,317,231 A * 5/1967 Lindquist ................ E05B 53/00 292/336.3
(Continued)

FOREIGN PATENT DOCUMENTS

DE 102014207110 A1 10/2015
EP 3045623 A1 7/2016
(Continued)

OTHER PUBLICATIONS

International Search Report; International Searching Authority; International Application No. PCT/US2019/044685; Nov. 21, 2019; 2 pages.
(Continued)

*Primary Examiner* — Mark A Williams
(74) *Attorney, Agent, or Firm* — Taft Stettinius & Hollister LLP

(57) ABSTRACT

An exemplary closure assembly includes a swinging barrier, a pushbar assembly mounted to a first side of the barrier, a remote trim assembly mounted to a second side of the barrier, and a transmission assembly that extends at least partially through the barrier and couples remote trim assembly and the pushbar assembly. The pushbar assembly includes a latchbolt and a pushbar operable to retract the latchbolt. The remote trim includes a handle that is operably coupled with the latchbolt via the transmission assembly such that the handle is operable to retract the latchbolt. The handle is positioned above the pushbar such that a vertical offset distance is defined therebetween. The offset distance is selected such that a user having a height within a selected range of heights is able to actuate the pushbar assembly, but cannot actuate the trim assembly.

24 Claims, 8 Drawing Sheets

(51) Int. Cl.

| | |
|---|---|
| ***E05B 65/00*** | (2006.01) |
| *E05B 9/04* | (2006.01) |

(56) References Cited

U.S. PATENT DOCUMENTS

| | | | | | |
|---|---|---|---|---|---|
| 3,563,585 | A * | 2/1971 | Welch | E05B 65/1066 292/234 |
| 3,791,180 | A * | 2/1974 | Doyle | E05B 59/00 292/34 |
| 3,875,772 | A * | 4/1975 | Ebersman | E05B 65/1086 292/38 |
| 4,101,153 | A * | 7/1978 | Dozier | E05B 1/0053 70/92 |
| 4,961,330 | A | 10/1990 | Evans | |
| 5,362,116 | A | 11/1994 | Doyle et al. | |
| 5,492,380 | A | 2/1996 | Smallegan et al. | |
| RE35,268 | E | 6/1996 | Frolov et al. | |
| 5,588,686 | A | 12/1996 | Riley et al. | |
| 5,590,917 | A * | 1/1997 | Brooks | E05B 65/1046 70/92 |
| 5,658,026 | A | 8/1997 | Nigro, Jr. et al. | |
| 5,664,816 | A | 9/1997 | Nigro, Jr. et al. | |
| 5,738,394 | A | 4/1998 | Arabia, Jr. et al. | |
| 5,850,710 | A * | 12/1998 | Brock | E06B 3/50 49/164 |
| 7,100,405 | B2 * | 9/2006 | West | E05B 65/0007 292/13 |
| 8,376,415 | B2 * | 2/2013 | Uyeda | E05C 7/04 292/DIG. 21 |
| 9,523,219 | B2 | 12/2016 | Macernis | |
| 9,580,944 | B2 * | 2/2017 | Arlinghaus | E05B 53/005 |
| 9,803,396 | B2 | 10/2017 | Timothy | |
| 2004/0112552 | A1 | 6/2004 | Rooth | |
| 2006/0103142 | A1 | 5/2006 | Talpe | |
| 2006/0192393 | A1 | 8/2006 | Johansson et al. | |
| 2007/0246947 | A1 | 10/2007 | Banks et al. | |
| 2008/0115543 | A1 | 5/2008 | Lanigan et al. | |
| 2011/0089715 | A1 | 4/2011 | Gerbracht | |
| 2012/0211999 | A1 * | 8/2012 | VanHellemont | E05B 65/0014 292/96 |
| 2014/0339835 | A1 | 11/2014 | Wepf | |
| 2015/0308155 | A1 * | 10/2015 | Eller | E05B 47/0012 292/143 |
| 2015/0337575 | A1 | 11/2015 | Macernis | |
| 2016/0060924 | A1 | 3/2016 | Singh et al. | |
| 2016/0376816 | A1 | 12/2016 | Graham | |
| 2017/0145715 | A1 * | 5/2017 | Timothy | E05B 65/0007 |
| 2017/0292293 | A1 | 10/2017 | Lin | |
| 2017/0292294 | A1 | 10/2017 | Brennan et al. | |
| 2018/0030759 | A1 | 2/2018 | Chanbonpin | |

FOREIGN PATENT DOCUMENTS

| | | | |
|---|---|---|---|
| EP | 2855807 | B1 | 10/2017 |
| FR | 2755458 | A1 | 5/1998 |
| FR | 2866667 | A1 | 8/2005 |
| JP | 48102098 | H | 11/1973 |

OTHER PUBLICATIONS

Written Opinion of the International Searching Authority; International Searching Authority; International Application No. PCT/US2019/044685; Nov. 21, 2019; 9 pages.

Extended European Search Report; European Patent Office; Oct. 4, 2021; 11 pages.

Canadian Office Action, Canadian Intellectual Property Office, Canadian Patent Application No. 3,109,773, May 31, 2022, 4 pages.

Canadian Office Action, Canadian Intellectual Property Office, Canadian Patent Application No. 3,109,773, Mar. 18, 2024, 4 pages.

European Examination Report, European Patent Office, European Patent Application No. 19844190.9, Aug. 22, 2024, 5 pages.

* cited by examiner

EXIT DEVICE WITH REMOTE TRIM INPUT

CROSS-REFERENCE TO RELATED APPLICATIONS

The present application is a divisional of U.S. patent application Ser. No. 16/051,646 filed Aug. 1, 2018 and issued as U.S. Pat. No. 11,306,512, the contents of which are hereby incorporated by reference in their entirety.

TECHNICAL FIELD

The present disclosure generally relates to exit devices, and more particularly but not exclusively relates to exit devices for selectively restricting access to an area that may be dangerous to children.

BACKGROUND

Many institutions include recreational areas that children should not be allowed to enter without a supervising adult, and which are typically gated or otherwise enclosed. For example, swimming pool areas are typically gated or otherwise enclosed to prevent free access to the pool, as unsupervised children run the risk of drowning. Doors providing access to such enclosed areas typically are provided with an exit device that allows free egress from inside the secured area, for example in the event of an emergency situation. The unsecured side of such doors are typically provided with a standard exit device trim, which is mounted opposite the exit device and at the same height as the exit device.

Regardless of whether the trim is locked or unlocked, some such systems have certain drawbacks. When the trim is locked, for example, only those having a proper key or credential will be able to actuate the trim in the manner required to access the secured area, which may be inconvenient for users and management personnel. When the trim is unlocked, however, any person able to manipulate the trim (e.g., by turning the handle thereof) will have potential access to the secured area. As will be appreciated, it may be undesirable for small children to have access to the secured area, particularly when that secured area includes a pool or other features that are both attractive and dangerous to children. For these reasons among others, a need remains for further improvements in this technological field.

SUMMARY

An exemplary closure assembly includes a swinging barrier, a pushbar assembly mounted to a first side of the barrier, a remote trim assembly mounted to a second side of the barrier, and a transmission assembly that extends at least partially through the barrier and couples remote trim assembly and the pushbar assembly. The pushbar assembly includes a latchbolt and a pushbar operable to retract the latchbolt. The remote trim includes a handle that is operably coupled with the latchbolt via the transmission assembly such that the handle is operable to retract the latchbolt. The handle is positioned above the pushbar such that a vertical offset distance is defined therebetween. The offset distance is selected such that a user having a height within a selected range of heights is able to actuate the pushbar assembly, but cannot actuate the trim assembly. Further embodiments, forms, features, and aspects of the present application shall become apparent from the description and figures provided herewith.

DETAILED DESCRIPTION OF ILLUSTRATIVE EMBODIMENTS

Figure 1:
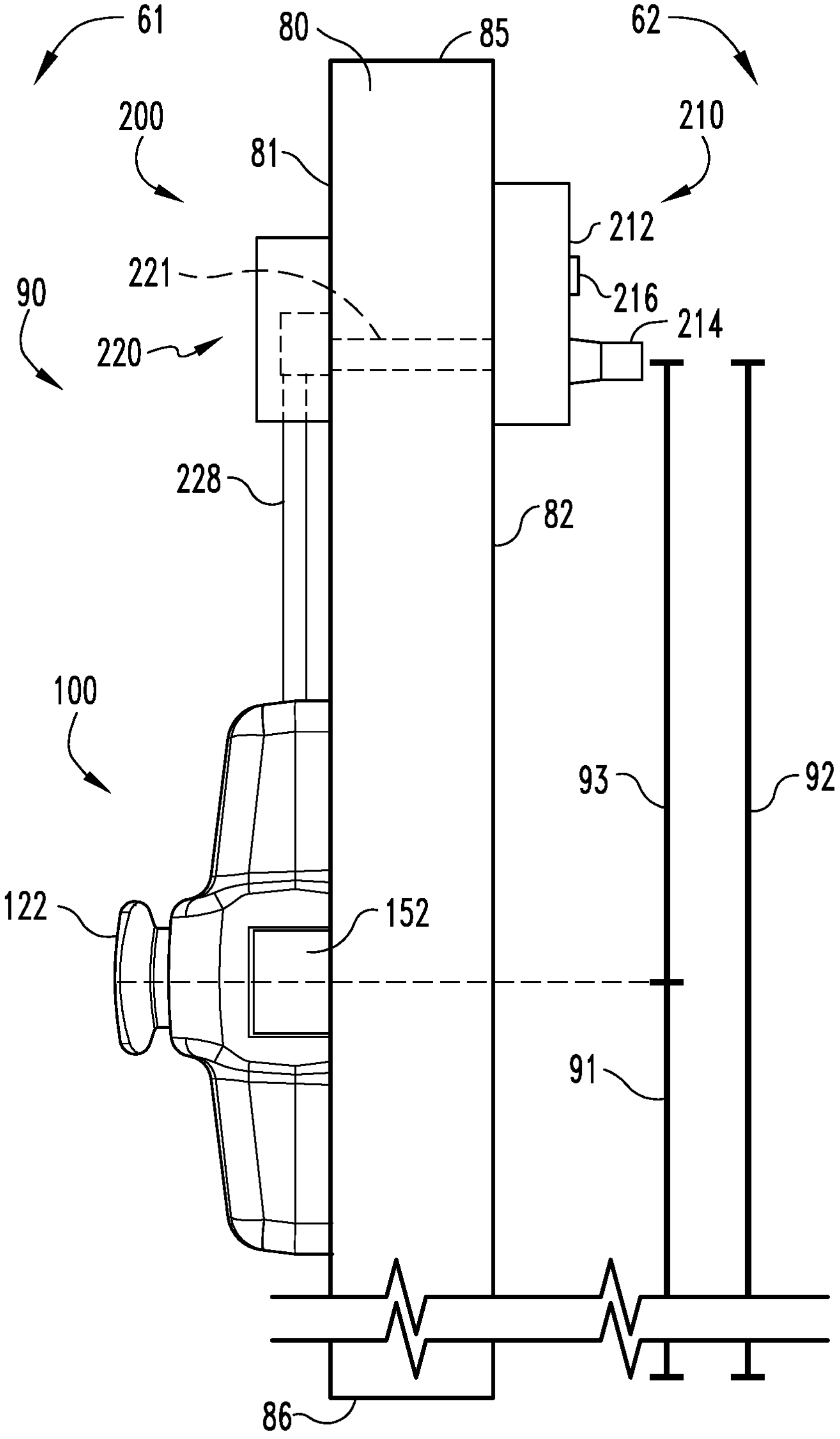
FIG. 1 is a side view of a closure assembly including a door and an exit device according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Figure 2:
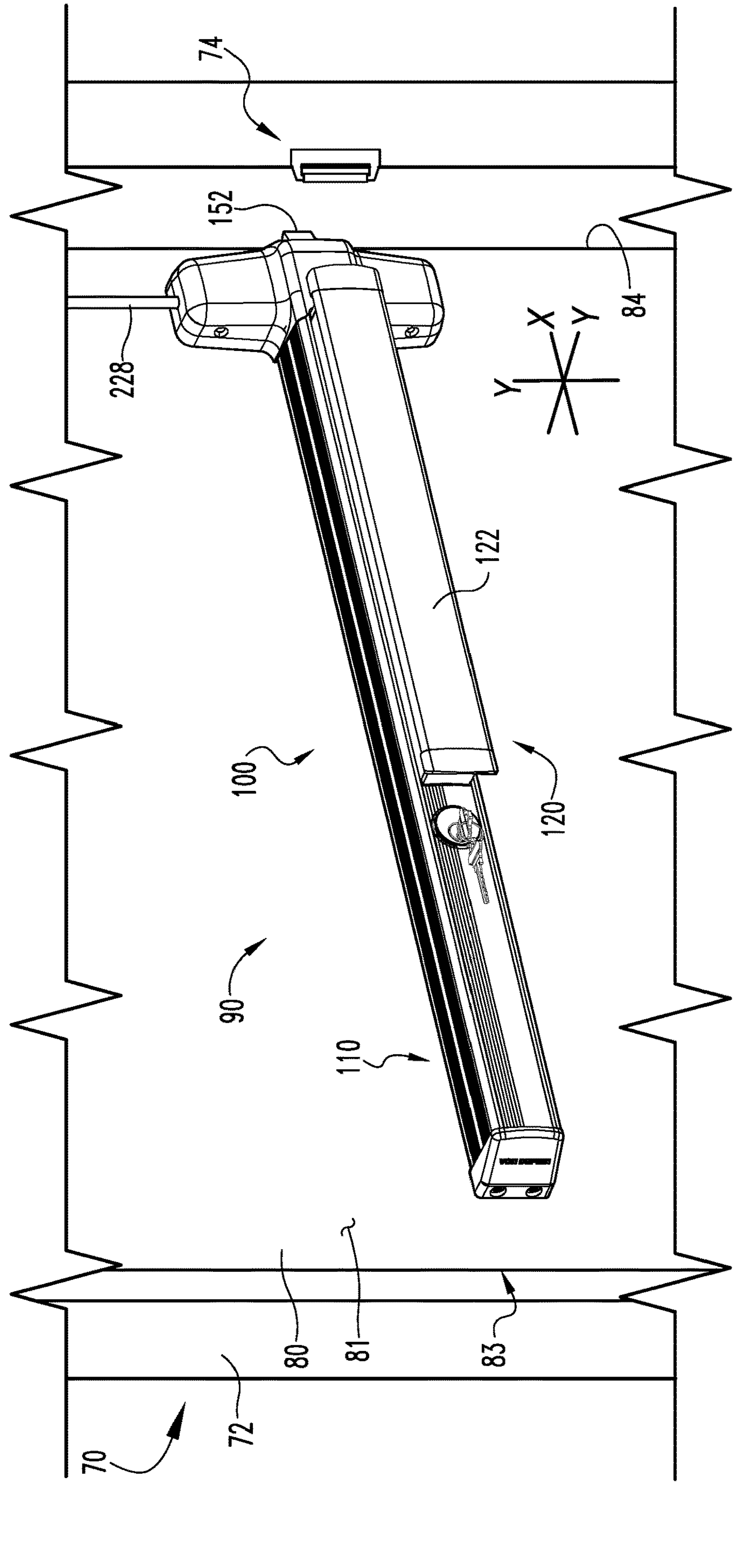
FIG. 2 is a perspective view of a pushbar assembly that may be utilized in the closure assembly.

With reference to FIGS. 1 and 2, illustrated therein is a closure assembly 70 including a barrier in the form of a door 80 and an exit device 90 according to certain embodiments. The exit device 90 generally includes a pushbar assembly 100 including a latchbolt 152, and a remote actuation assembly 200 including a remote trim 210 and a surface-mounted transmission assembly 220 according to certain embodiments. The closure assembly 70 further includes a frame 72 to which the door 80 is pivotably mounted, and a strike 74 that is mounted to the frame 72 and which engages the latchbolt 152 to retain the door 80 in its closed position. While the illustrated barrier is provided in the form of a door 80, it is to be appreciated that the barrier may take another form, such as a gate.

When in its closed position, the door 80 defines a barrier between an inner or secured region 61 and an outer or unsecured region 62, and has an inner or secured side 81 facing the secured region 61 and an outer or unsecured side 82 facing the unsecured region 62. The pushbar assembly 100 is mounted to the secured side 81 of the door 80, and the remote trim 210 is mounted to the unsecured side 82 of the door 80. The door 80 also has a hinge edge 83 and an opposite latch edge 84, as well as a top edge 85 and an opposite bottom edge 86. As described herein, the pushbar assembly 100 and the remote trim 210 are mounted to the door 80 at different heights such that certain users capable of actuating the pushbar assembly 100 are not capable of actuating the remote trim 210.

The pushbar assembly 100 generally includes a mounting assembly 110 configured for mounting to the door 80, a drive assembly 120 movably mounted to the mounting assembly 110, a latch control assembly 140 operably connected with the drive assembly 120, and a latchbolt mechanism 150 operably connected with the latch control assembly 140. The drive assembly 120 includes a manually actuated pushbar 122 which, when moved from a projected position to a depressed position, actuates the drive assembly 120. As described herein, such actuation of the drive assembly 120 actuates the latch control assembly 140 and retracts the latchbolt 152.

Figure 3:
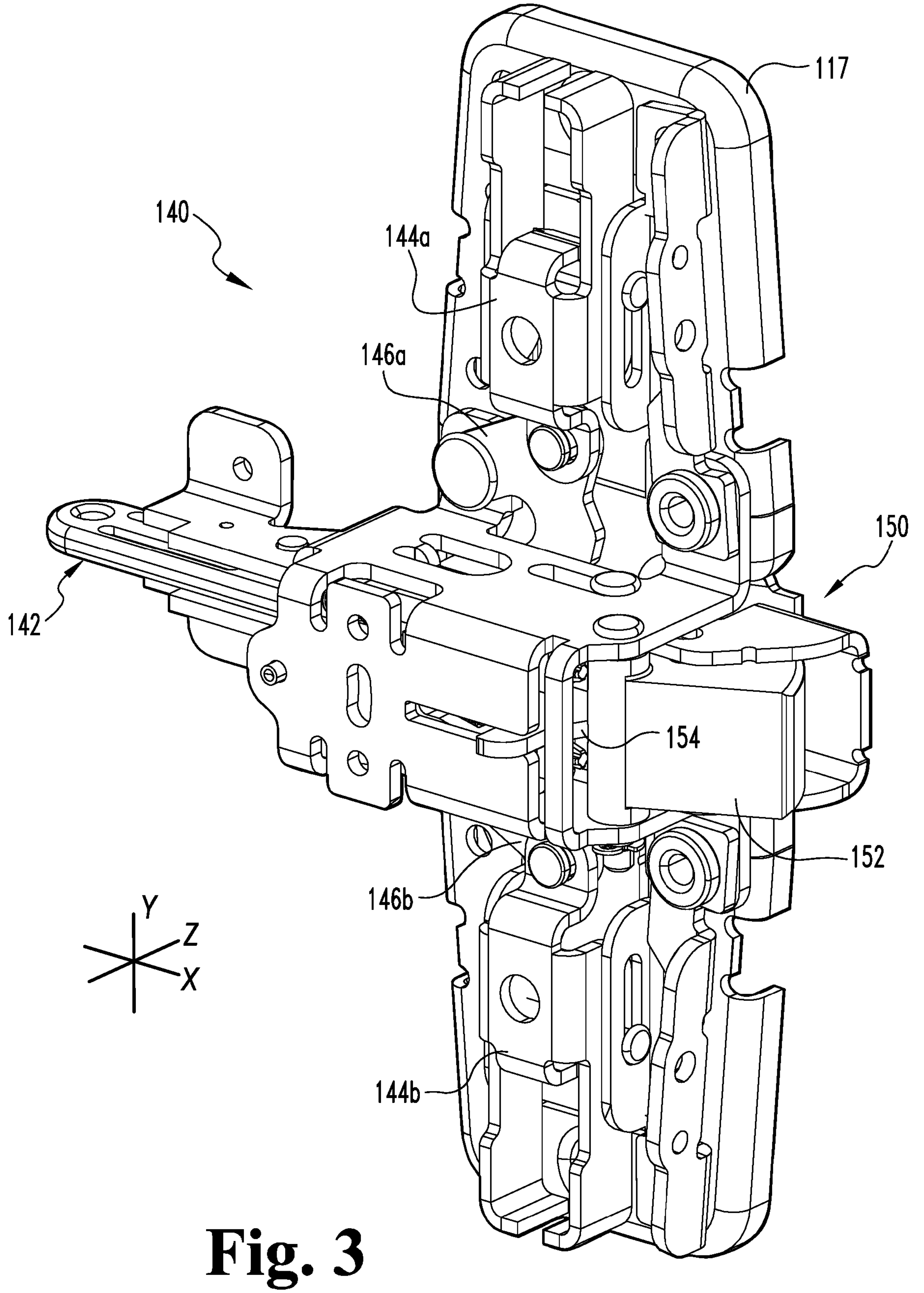
FIG. 3 is a perspective view of a portion of the pushbar assembly.

With additional reference to FIG. 3, the latch control assembly 140 is mounted to a header plate 117 of the mounting assembly 110 for movement between an actuated state and a deactuated state. The latch control assembly 140 includes a control link 142 that is coupled to a retractor 154 of the latchbolt mechanism 150 such that movement of the control link 142 in the distal direction (to the left in FIG. 3) actuates the latchbolt mechanism 150 and retracts the latchbolt 152. The drive assembly 120 is configured to drive the control link 142 in the distal direction in response to movement of the pushbar 122 to its depressed position such that depression of the pushbar 122 retracts the latchbolt 152.

The latch control assembly 140 further includes a pair of drivers 144 slidably mounted to the header plate 117, and a pair of pivot cranks 146 operably connecting the control link 142 with the drivers 144. More particularly, an upper driver 144*a* is connected to the control link 142 via an upper pivot crank 146*a*, and a lower driver 144*b* is connected to the control link 142 via a lower pivot crank 146*b*. Each of the control link 142, the upper driver 144*a*, and the lower driver 144*b* has a deactuated position in the deactuated state of the latch control assembly 140, and has an actuated position in the actuated state of the latch control assembly 140. The control link 142 has a proximal deactuated position and a distal actuated position, and moves in the longitudinal (X) directions during actuation and deactuation of the latch control assembly 140. Each of the drivers 144 has a laterally-outward deactuated position and a laterally-inward actuated position, and moves in the lateral (Y) directions during actuation and deactuation of the latch control assembly 140.

As used herein, the terms "laterally inward" and "laterally outward" may be used to describe the lateral (Y) directions with reference to the longitudinal (X) axis 102 along which the control link 142 extends. More specifically, the term "laterally inward" may be used to describe a lateral (Y) direction extending toward the longitudinal (X) axis 102, and the term "laterally outward" may be used to describe a lateral (Y) direction extending away from the longitudinal (X) axis 102. Thus, for the upper driver 144*a*, the laterally inward direction is the downward direction, and the laterally outward direction is the upward direction. For the lower driver 144*b*, by contrast, the laterally inward direction is the upward direction, and the laterally outward direction is the downward direction.

During actuation and deactuation of the latch control assembly 140, the pivot cranks 146 convert longitudinal movement of the control link 142 to lateral movement of the drivers 144 and vice versa. With the latch control assembly 140 in its deactuated state, actuation of the drive assembly 120 causes the control link 142 to move in the distal direction toward the actuated position thereof. As the control link 142 is driven toward its actuated position, the pivot cranks 146 translate the distal movement of the control link 142 to laterally-inward movement of the drivers 144, thereby moving the drivers 144 to the actuated positions thereof. When an appropriate deactuating force is exerted on the latch control assembly 140, for example by the drive assembly 120, the latch control assembly 140 returns to its deactuated state. During deactuation of the latch control assembly 140, the control link 142 and the drivers 144 return to the deactuated positions thereof, and the pivot cranks 146 correlate the laterally-outward movement of the drivers 144 with the proximal movement of the control link 142.

The remote trim assembly 210 generally includes a housing 212 mounted to the unsecured side 82 of the door 80, and a handle 214 rotatably mounted to the housing 212. A tailpiece 221 of the transmission assembly 220 is operably coupled with the handle 214 such that rotation of the handle 214 causes a corresponding rotation of the tailpiece 221. The handle 214 is biased toward a home position, and can be actuated by a user to rotate toward a rotated position. In the illustrated embodiment, the tailpiece 221 extends through the door 80 and engages the transmission assembly 220. In certain embodiments, the trim assembly 210 may include a lock cylinder 216 by which the handle 214 can be locked and unlocked.

Figure 4:
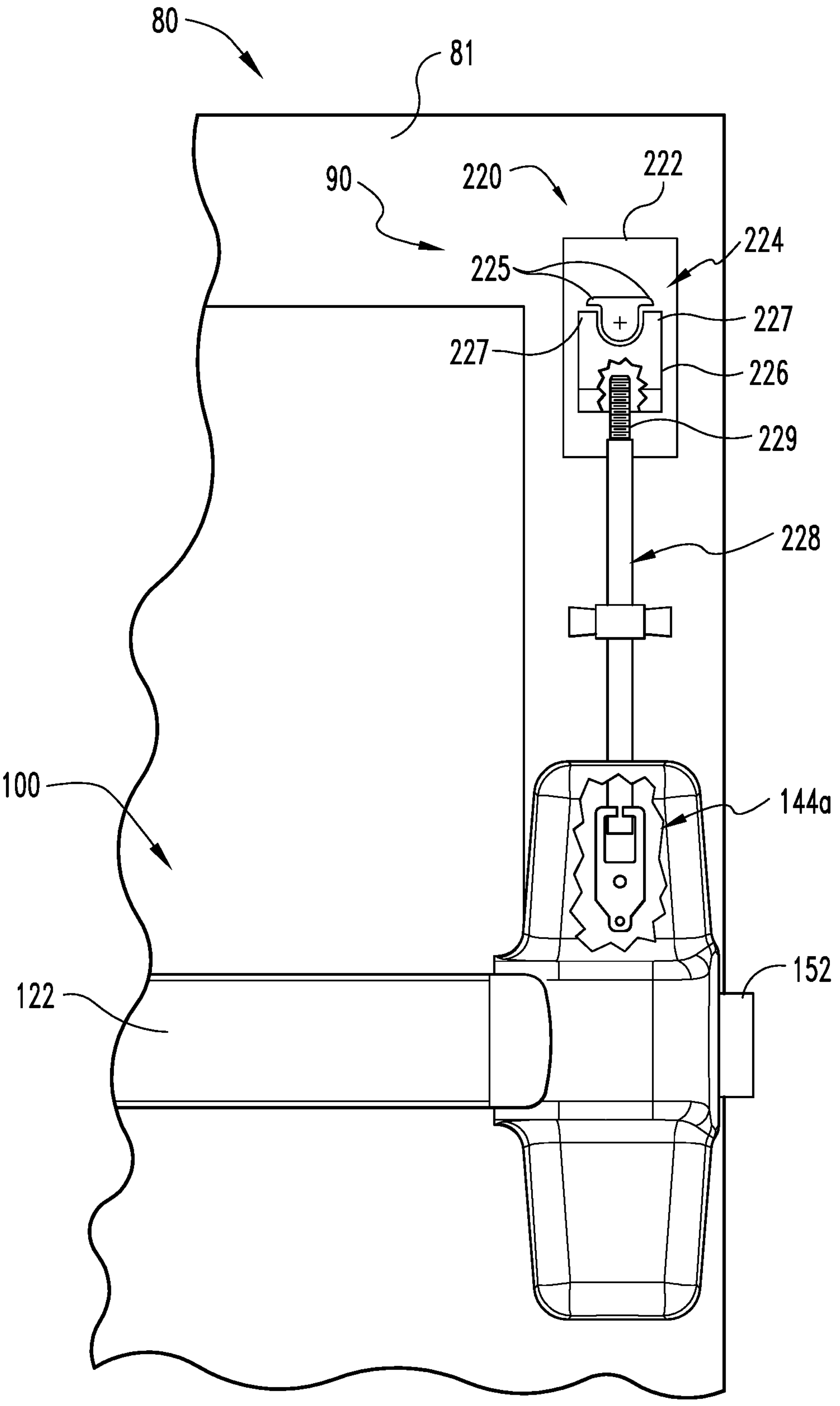
FIG. 4 illustrates the closure assembly as viewed from the secured side of the door.

With additional reference to FIG. 4, the transmission assembly 220 generally includes the tailpiece 221, a housing 222 mounted to the secured side 81 of the door 80, a cam 224 rotatably mounted in the housing 222, a follower 226 engaged with the cam 224, and a rigid rod 228 coupled with the follower 226 and the upper driver 144*a*. The upper end

229 of the rod 228 may be threaded such that the rod 228 screws into the follower 226 and provides for length adjustment. In such forms, relative rotation of the follower 226 and rod 228 in one direction increases the effective length of the rod 228, while relative rotation of the follower 226 and rod 228 in the opposite decreases the effective length of the rod 228.

The cam 224 is operably coupled with the tailpiece 221 such that rotation of the handle 214 causes a corresponding rotation of the cam 224. The cam 224 includes a pair of radial arms 225 that extend away from the rotational axis of the cam 224, and the follower 226 includes a pair of ledges 227 that are adjacent the arms 225 when the cam 224 is in a home position corresponding to the home position of the handle 214. When the handle 214 is rotated from the home position, one of the arms 225 engages a corresponding one of the ledges 227 and drives the follower 226 downward. More specifically, rotation of the handle 214 in the clockwise direction causes a first of the arms 225 to engage a first of the ledges 227, and rotation of the handle 214 in the counterclockwise direction causes the other of the arms 225 to engage the other of the ledges 227. Thus, rotation of the handle 214 in either direction causes downward movement of the follower 226. Additionally, the housing 222 covers the cam 224 and the follower 226 to discourage users from tampering with cam 224 and/or the follower 226.

The downward movement of the follower 226 causes a corresponding downward movement of the rod 228. As a result, the rod 228 drives the upper driver 144*a* in its laterally inward actuating direction, thereby actuating the latch control assembly 140 and retracting the latchbolt 152. More specifically, the upper pivot crank 146*a* translates the downward movement of the upper driver 144*a* to distal movement of the control link 142, and the retractor 154 retracts the latchbolt 152 in response to distal movement of the control link 142.

In the illustrated form, the downward movement of the follower 226 is transmitted to the upper driver 144*a* by the rigid rod 228. It is also contemplated that another pushing member may be utilized to cause the upper driver 144*a* to move with the follower 226, such as a push/pull cable. Additionally, while the illustrated cam 224 and follower 226 are arranged to translate rotation of the tailpiece 221 to downward movement of the rod 228, it is to be appreciated that other arrangements may be utilized. For example, the cam 224 and follower 226 may be arranged to translate rotation of the tailpiece 221 to upward movement of the rod 228, and a rack and pinion arrangement may be utilized to drive the upper driver 144*a* downward in response to upward movement of the rod 228.

As should be evident from the foregoing, each of the pushbar assembly 100 and the remote actuating assembly 200 is operable to retract the latchbolt 152. As a result, the door 80 can be opened both from the secured region 61 (via the pushbar assembly 100) and from the unsecured region 62 (via the remote actuating assembly 200). More specifically, users in the secured region 61 can open the door 80 by depressing the pushbar 122 and pushing the door 80, thereby providing egress from the secured region 61 to the unsecured region 62. Conversely, users in the unsecured region 62 can open the door 80 by rotating and subsequently pulling the handle 214, thereby providing entry to the secured region 61 from the unsecured region 62.

The pushbar assembly 100 and the remote trim 210 are mounted to the door 80 at different heights such that certain users capable of actuating the pushbar assembly 100 are not capable of actuating the remote trim 210. More specifically, the pushbar assembly 100 is mounted to the secured side 81 of the door 80 with the pushbar 122 a first distance 91 from the bottom edge 86 of the door 80, the remote trim 210 is mounted to the unsecured side 82 of the door 80 with the handle 214 a second distance 92 from the bottom edge 86 of the door 80, and the second distance 92 is greater than the first distance 91 by an offset distance 93.

The ability of a user to actuate the exit device 90 depends in part upon the ability of the user to reach and manipulate an actuator (i.e., the pushbar 122 or the handle 214). Due to the varying heights at which the pushbar 122 and the handle 214 are mounted, different subsets of users are capable of actuating the pushbar assembly 100 and the remote trim 200. For example, users shorter than a first height corresponding to the first distance 91 are unable to reach the pushbar 122, and thus cannot actuate the exit device 90 from either side 81, 82 of the door. Users taller than a second height corresponding to the second distance 92 can reach both the pushbar 122 and the handle 214, and thus are capable of actuating the exit device 90 from either side 81, 82 of the door. Furthermore, there exists a subset of users whose height is greater than the first height and less than the second height. Such users are capable of depressing the pushbar 122 to actuate the exit device 90 from the secured side 81 of the door 80, but are not tall enough to rotate the handle 214 in the manner required to actuate the exit device 90 from the unsecured side of the door 80.

The various dimensions 91, 92, 93 may be selected to facilitate the actuation of the exit device 90 in certain manners while discouraging actuation of the exit device 90 in other manners. For example, the first height 91 may be selected to allow both children and adults to actuate the pushbar assembly 100, thereby facilitating free egress from the secured area 61. The first height 91 may, for example, be in the range of 38 inches to 44 inches. The second height 92 may be selected to allow adults to actuate the remote trim 210 while discouraging such actuation by children. The second height 92 may, for example, be in the range of 54 inches to 60 inches. The offset distance 93 may be selected to exclude a certain range of individuals that can actuate the pushbar assembly 100 from actuating the remote trim 210. The offset distance 93 may, for example, be in the range of 6 inches to 18 inches.

Figure 5:
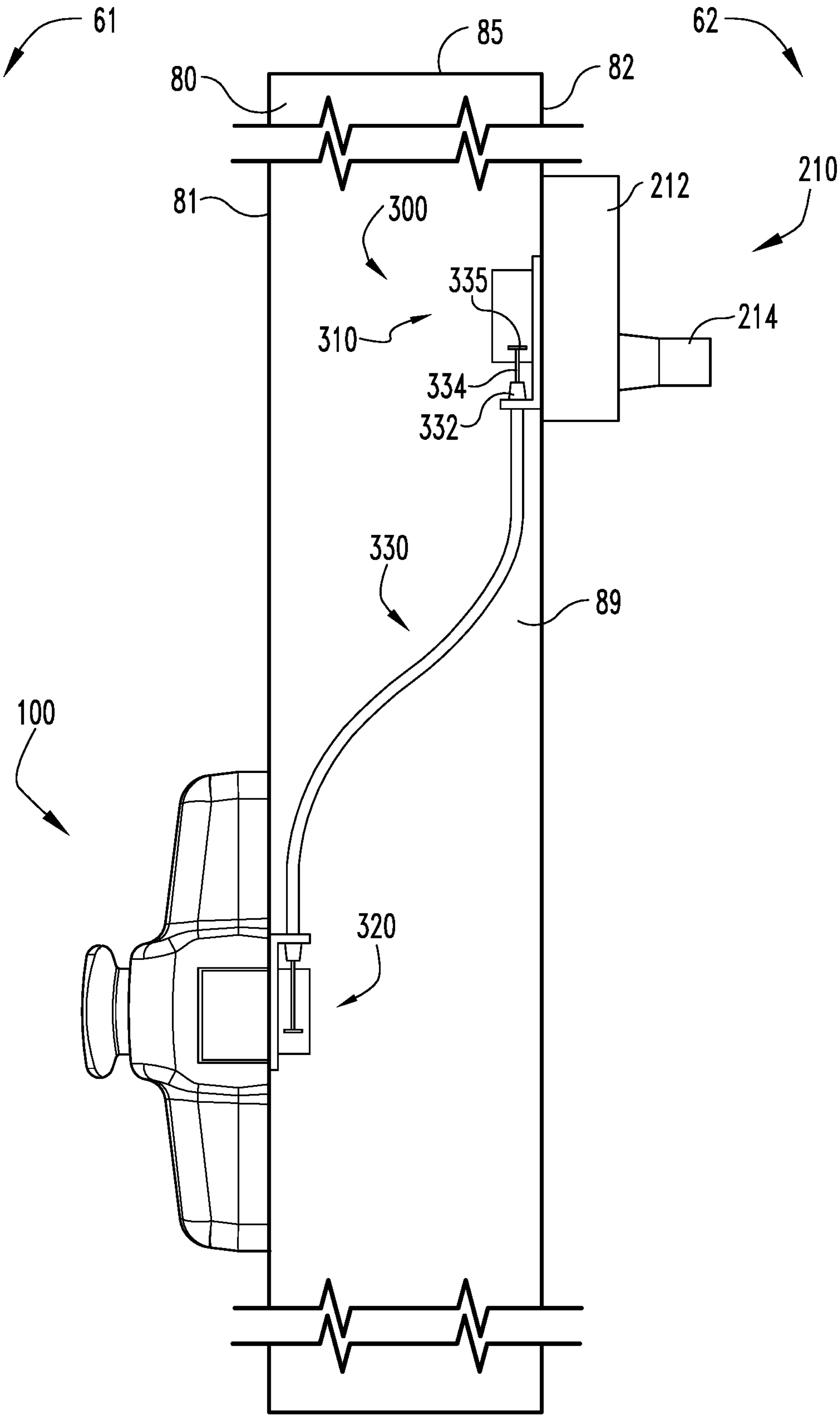
FIG. 5 is a side view of the closure assembly and an exit device according to certain embodiments.

With additional reference to FIG. 5, illustrated therein is another embodiment of an exit device 100'. The exit device 90' includes the above-described pushbar assembly 100 and remote trim 210, and further includes a concealed transmission assembly 300 according to certain embodiments. The concealed transmission assembly 300 is disposed in the hollow interior 89 of the door 80, and actuates the latch control assembly 140 in response to actuation of the remote trim 210. The illustrated transmission assembly 300 includes an upper or first rotational transfer mechanism 310 mounted to the remote trim 210 and positioned within the hollow interior 89, a lower or second rotational transfer mechanism 320 mounted to the pushbar assembly 100 and positioned within the hollow interior 89, and a connector 330 extending between and connecting the rotational transfer mechanisms 310, 320.

As described herein, the transmission assembly 300 is arranged such that rotation of the handle 214 causes a corresponding rotation of the lower rotational transfer mechanism 320. The lower rotational transfer mechanism 320 is coupled to a cam such as the above-described cam 224, and a follower such as the above-described follower 226 is coupled to either the upper driver 144*a* or the lower driver 144*b*. The cam and follower are arranged such that rotation of the second rotational mechanism 320 drives the corresponding driver 144a/144b in its actuating direction, thereby actuating the latch control assembly 140 and retracting the latchbolt 152.

Figure 6:
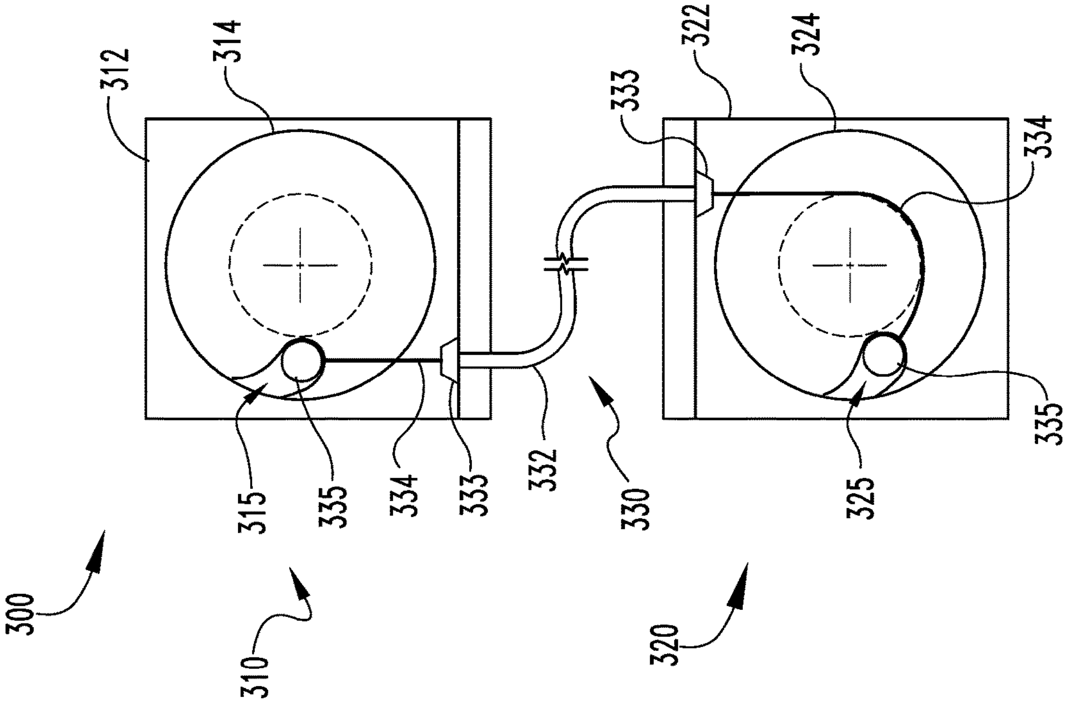
FIG. 6 illustrates a transmission assembly of the exit device illustrated in FIG. 5.

With additional reference to FIG. 6, illustrated therein is the transmission assembly 300. The upper transmission assembly 310 includes a mounting bracket 312 and a pulley 314 rotatably mounted to the mounting bracket 310. The lower transmission assembly similarly includes a mounting bracket 322 and a pulley 324 rotatably mounted to the mounting bracket. The illustrated connector 330 is provided in the form of a push/pull cable having an outer sheath 332 and an inner cable 334.

Each end of the outer sheath 332 has an anchor 333, and each anchor 333 is coupled to a corresponding one of the brackets 310, 320 such that the sheath 332 remains relatively stationary relative to the door. Each end of the inner cable 334 has a coupler 335, and each coupler 335 is received in a slot 315, 325 formed in the corresponding pulley 314, 324 such that the couplers 335 travel with the pulleys 314, 324, thereby causing the lower pulley 324 to rotate with the upper pulley 314. In the illustrated form, the lower end of the cable 334 is partially wrapped around the lower side of the lower pulley 324 such that rotation of the upper pulley 314 in one direction (clockwise in FIG. 6) causes a corresponding rotation of the lower pulley 324 in the opposite direction (counter-clockwise in FIG. 6).

The upper pulley 314 is operably coupled with the handle 214 such that rotation of the handle 214 causes a corresponding rotation of the pulley 314. The lower pulley 324 is operably coupled with the cam such that rotation of the pulley 324 causes a corresponding rotation of the cam. Thus, rotation of the handle 214 is transmitted to the cam via the transmission assembly 300 such that the cam drives the follower in response to rotation of the handle 214. The follower in turn drives the corresponding driver 144a/144b in its actuating direction, thereby actuating the latch control assembly 140 and retracting the latchbolt 152. As a result, the handle 214 is operable to retract the latchbolt 152 to allow for entry to the secured area 61 from the unsecured area 62.

In the illustrated form, the flexible cable 330 is utilized in combination with an upper rotational transfer mechanism 310 and a lower rotational transfer mechanism 320. In certain embodiments, one or both of the rotational transfer mechanisms 310, 320 may be omitted. For example, in certain embodiments, the trim assembly 210 may include a mechanism that translates rotational motion of the handle 214 to linear movement of a lift finger. In such forms, the upper end of the sheath 332 may be anchored near the lift finger and the upper end of the cable 334 may be coupled to the lift finger such that linear movement of the lift finger drives the cable 334 in the actuating direction, and the upper rotational transfer mechanism 310 may be omitted. In certain embodiments, the lower end of the sheath 332 may be anchored to the header plate 117 and the lower end of the cable 334 may be coupled with one of the drivers 144 such that the cable 332 is operable to pull the driver 144 in its laterally inward actuating direction. In such forms, the lower rotational transfer mechanism 320 may be omitted.

Figure 7:
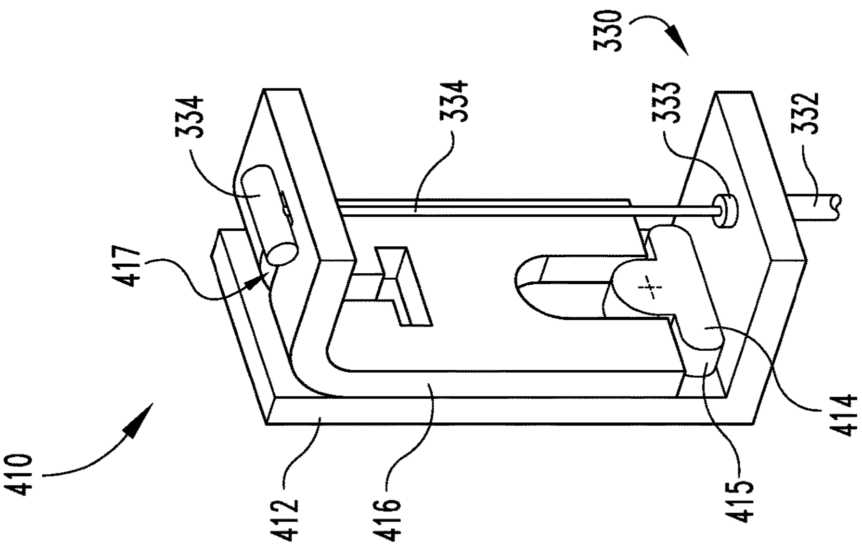
FIGS. 7-9 illustrate rotational transfer mechanisms according to certain embodiments.
Figure 9:
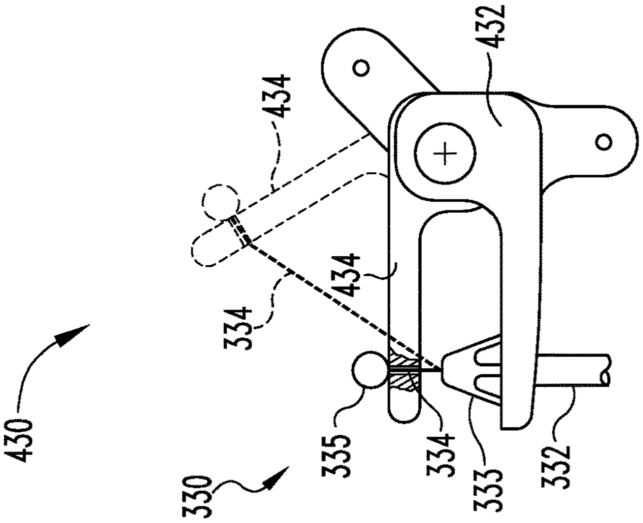
Figure 8:
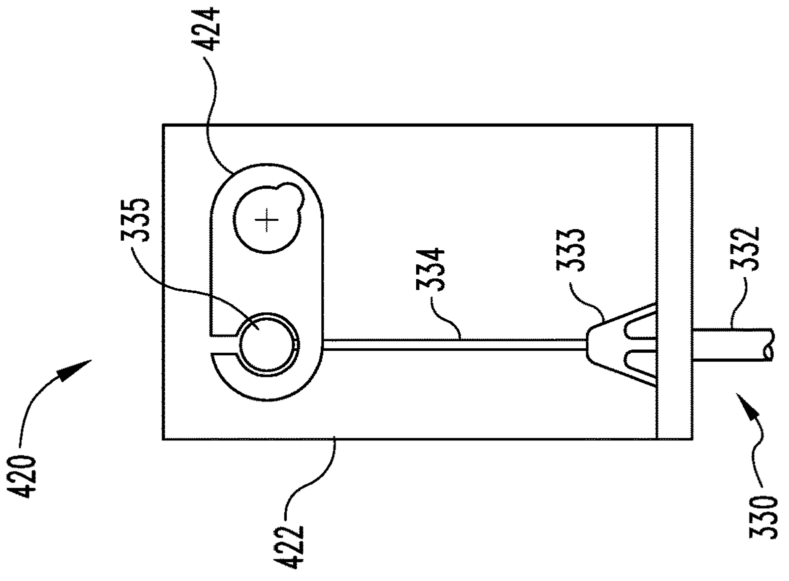

With additional reference to FIGS. 7-9, illustrated therein are additional embodiments of rotational transfer mechanisms that may be used in the transmission assembly 300. The rotational transfer mechanism 410 of FIG. 7 is somewhat similar to the above-described cam arrangement, and includes a mounting bracket 412, a cam 414 rotatably mounted to the mounting bracket 412, and a follower 416 slidably mounted to the mounting bracket 412. The anchor 333 is engaged with the mounting bracket 412, and the coupler 335 is engaged with the follower 416. The cam 414 is operably coupled with trim assembly 210 such that rotation of the handle 214 causes a corresponding rotation of the cam 414. The cam 414 includes a pair of arms 415 that project from opposite sides of the cam 414, and which engage the follower 416 in the manner described above. Thus, rotation of the cam 414 in either direction causes the follower 416 to pull the cable 334 upward, thereby actuating the latch control assembly 140 in the manner described above.

The rotational transfer mechanism 420 illustrated in FIG. 8 includes a mounting bracket 422 and a lever 424 pivotably mounted to the mounting bracket 422. The anchor 333 is engaged with the mounting bracket 422, and the coupler 335 is engaged with the lever 424. The lever 424 is operationally coupled with the trim assembly 210 such that rotation of the handle 214 causes a corresponding pivotal movement of the lever 424. Thus, rotation of the handle 214 in one direction (clockwise in FIG. 8) causes the lever 424 to pull the cable 334 upward, thereby actuating the latch control assembly 140 in the manner described above.

The rotational transfer mechanism 430 illustrated in FIG. 9 includes a stationary jaw 432 that is secured to the trim assembly housing 212 and a pivoting jaw 434 that is operably coupled with the handle 214 such that rotation of the handle 214 causes a corresponding pivoting of the jaw 434. The anchor 333 is engaged with the stationary jaw 432, and the coupler 335 is engaged with the pivoting jaw 434. Thus, rotation of the handle 214 in one direction (clockwise in FIG. 8) causes the pivoting jaw 434 to pull the cable 334 upward, thereby actuating the latch control assembly 140 in the manner described above.

Figure 10:
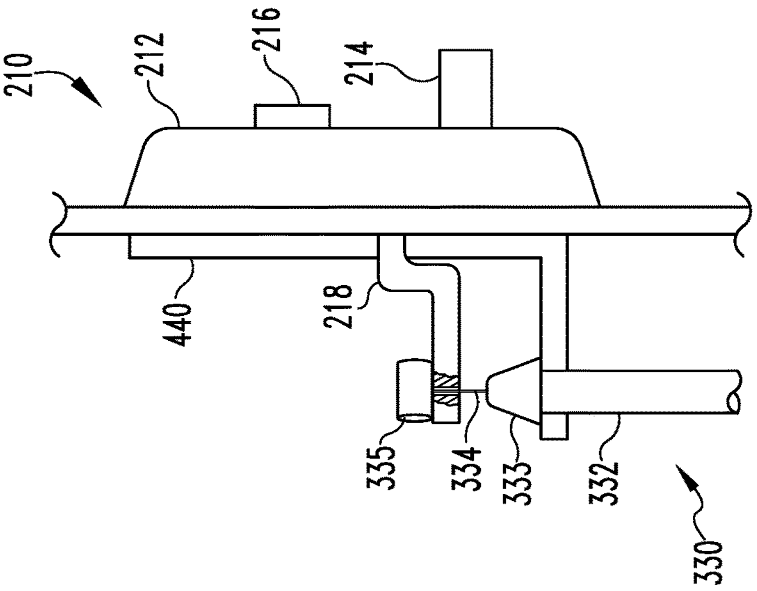
FIG. 10 is a side view of a trim assembly and a portion of a transmission assembly according to certain embodiments.

FIG. 10 illustrates a situation in which the rotational transfer mechanism is provided within the trim assembly 210 such that rotation of the handle 214 causes a corresponding linear movement of a lift finger 218. In such forms, the upper end of the sheath 332 may be anchored to a mounting plate 440 and the upper end of the cable 334 may be coupled to the lift finger 218 such that movement of the lift finger 218 pulls the cable 334 in its actuating direction.

Figure 11:
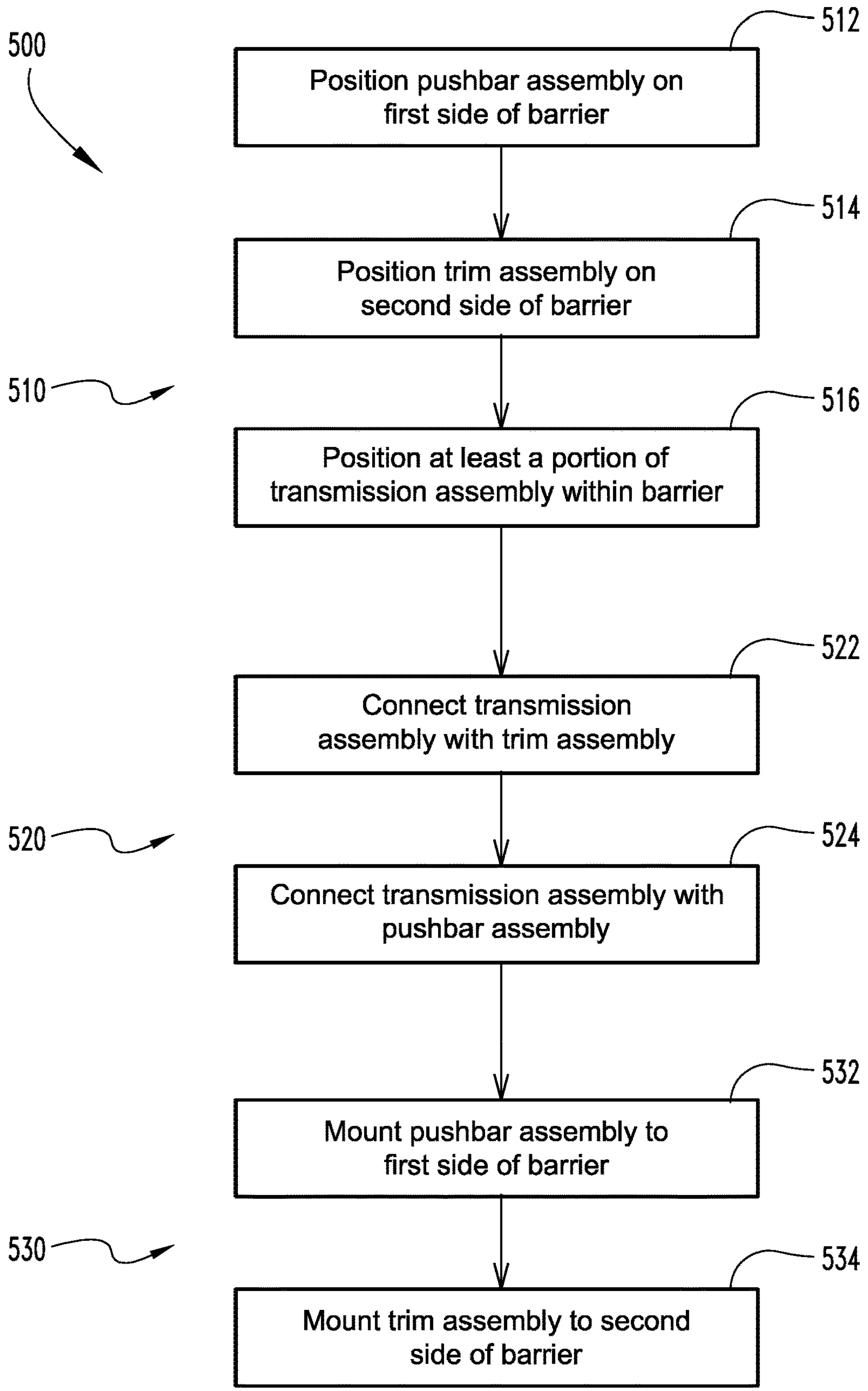
FIG. 11 is a schematic flow diagram of a process according to certain embodiments.

With additional reference to FIG. 11, illustrated therein is a process 500 according to certain embodiments. Operations and procedures illustrated for the processes in the present application are understood to be examples only, and operations and procedures may be combined or divided, and added or removed, as well as re-ordered in whole or in part, unless explicitly stated to the contrary.

The process 500 is a process of installing an exit device to a door, and generally includes a positioning procedure 510 in which various components of an exit device are positioned relative to the door, a connecting procedure 520 in which the components are connected to one another, and a mounting procedure 530 in which the components are mounted to the door. The door 80 generally includes a first side 81, an opposite second side 82, a top 85, and an opposite bottom 86. The exit device includes a pushbar assembly, a trim assembly, and a transmission assembly. While the process 500 is described hereinafter with specific reference to the exit devices 90, 90' described hereinabove, it is to be appreciated that the process 500 may be utilized with other forms of exit devices that include a pushbar assembly, a trim assembly, and a transmission assembly.

The positioning procedure 510 includes positioning operations 512, 514, 516, which generally involve positioning various components of an exit device 90, 90' relative to the door 80. The operation 512 involves positioning a pushbar assembly 100 on the first side 81 of the door 80, and the operation 514 involves positioning a trim assembly 210 on the second side 82 of the door 80. The operation 516 involves positioning at least a portion of the transmission assembly 300 within the door 80. The operation 516 may, for example, involve positioning the tailpiece 221 such that the tailpiece 221 extends through the door, positioning the connector 330 in the hollow interior 89 of the door 80, or passing a portion of the transmission assembly through an opening in a gate.

The connecting procedure 520 includes connecting operations 522, 524, which generally involve connecting various components of the exit device 90, 90' to one another. The operation 522 generally involves connecting a transmission assembly with the trim assembly 210. In certain embodiments, the operation 522 may involve connecting the transmission assembly 220 with the trim assembly 210. For example, the operation 522 may include coupling the tailpiece 221 with the trim assembly 210 and/or the cam 224 such that rotation of the handle 214 causes a corresponding rotation of the cam 224, thereby lifting the follower 226 and the rod 228.

In certain embodiments, the operation 522 may involve connecting the transmission assembly 300 with the trim assembly 210 such that rotation of the handle 214 causes a corresponding movement of the cable 334. For example, the operation 522 may include coupling the upper rotational transfer mechanism 310 with the trim assembly 210 such that rotation of the handle 214 causes a corresponding rotation of the pulley 314. As another example, the operation 522 may include coupling the rotational transfer mechanism 410 with the trim assembly 210 such that rotation of the handle 214 causes a corresponding rotation of the cam 414, thereby lifting the follower 416. As another example, the operation 522 may include coupling the rotational transfer mechanism 420 with the trim assembly 210 such that rotation of the handle 214 causes a corresponding pivotal movement of the lever 424. As a further example, the operation 522 may include coupling the rotational transfer mechanism 430 with the trim assembly 210 such that rotation of the handle 214 causes a corresponding pivotal movement of the pivoting jaw 434.

As noted above, certain embodiments of the operation 522 involve coupling the cable 334 with a rotational transfer mechanism that translates rotation of the handle to linear movement of the cable 334. In other embodiments, the rotational transfer mechanism may be included in the trim assembly 210 such that rotation of the handle 214 drives a lift finger linearly. In such forms, the operation 522 may involve coupling the cable 334 to the lift finger such that rotation of the handle 214 causes movement of the cable 334.

The operation 524 generally involves connecting the transmission assembly with the pushbar assembly 100. In certain embodiments, the operation 524 may involve connecting the transmission assembly 220 with the pushbar assembly 100. For example, the operation 524 may involve coupling the rod 228 with the upper driver 144*a*. In certain embodiments, the operation 524 may involve connecting the transmission assembly 220 with the pushbar assembly 100. As one example, the operation 524 may involve mounting the follower 226 to one of the drivers 144, for example in embodiments in which the cam 224 is mounted to the lower pulley 324. As another example, the operation 524 may involve connecting the lower end of the cable 334 to a component of the latch control assembly 140, such as one of the drivers 144. In such forms, the lower rotational transfer mechanism 320 may be omitted.

The mounting procedure 530 includes operations 532, 534, which generally involve mounting various components of the exit device 90, 90' to the door 80. The operation 532 involves mounting the pushbar assembly 100 to the first side 81 of the door 80 a first distance 91 from the bottom 86 of the door 80. In certain embodiments, the first distance 91 is between 34 inches and 48 inches. The operation 534 involves mounting the trim assembly 210 to the second side 82 of the door a second distance 92 from the bottom 86 of the door 80. As noted above, the second distance 92 is greater than the first distance 91 by an offset distance 93. In certain embodiments, the second distance 92 is at least 54 inches. In certain embodiments, the offset distance 93 is at least six inches.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of restricting access through a swinging barrier, the method comprising:

mounting an elongated horizontally-extending pushbar assembly to a first side of the swinging barrier at a first distance above a bottom of the swinging barrier, the pushbar assembly comprising a latchbolt and an elongated horizontally-extending pushbar operable to retract the latchbolt;

mounting a trim assembly on a second side of the swinging barrier at a second distance above the bottom of the swinging barrier, the trim assembly comprising a housing and a handle operable to rotate relative to the housing, wherein the second distance is greater than the first distance such that the handle is vertically offset from the pushbar by an offset distance to discourage a child from reaching the handle; and connecting the trim assembly with the pushbar assembly via a transmission assembly such that the latchbolt is operable to retract in response to rotation of the handle.

2. The method of claim 1, wherein the offset distance is at least six inches.

3. The method of claim 1, wherein at least a portion of the transmission assembly extends vertically within the swinging barrier.

4. The method of claim 3, wherein the at least a portion of the transmission assembly comprises a flexible cable.

5. The method of claim 1, wherein at least a portion of the transmission assembly extends vertically on the first side the swinging barrier.

6. The method of claim 3, wherein the at least a portion of the transmission assembly comprises a rigid rod.

7. The method of claim 1, wherein connecting the trim assembly with the pushbar assembly via the transmission assembly comprises:

operably coupling a cam with the trim assembly such that the cam rotates in response to rotation of the handle;

engaging a follower with the cam such that rotation of the cam causes a corresponding movement of the follower in an actuating direction;

operably coupling the follower with a first end portion of a connector; and operably coupling a second end portion of the connector with the pushbar assembly such that the latchbolt retracts in response to movement of the connector in the actuating direction.

8. An exit device assembly configured for mounting to a swinging barrier, the exit device assembly comprising:

an elongated horizontally-extending pushbar assembly configured for mounting to a first side of the swinging barrier, the pushbar assembly comprising a latch control assembly and an elongated horizontally-extending pushbar operable to actuate the latch control assembly;

a trim assembly configured for mounting to a second side of the swinging barrier, the trim assembly comprising an actuator; and a transmission assembly connecting the pushbar assembly and the trim assembly such that actuation of the actuator causes a corresponding actuation of the latch control assembly; and wherein the transmission assembly includes a vertically-extending portion that extends vertically such that the trim assembly is operable to be vertically offset from the pushbar assembly by an offset distance of at least six inches to discourage a child from reaching the actuator.

9. The exit device assembly of claim 8, wherein the vertically-extending portion comprises a rigid rod.

10. The exit device assembly of claim 8, wherein the vertically-extending portion comprises a flexible cable.

11. The exit device assembly of claim 8, wherein the vertically-extending portion is configured to be mounted to the swinging barrier at a location other than the second side of the swinging barrier.

12. The exit device assembly of claim 8, wherein the vertically-extending portion is configured to be mounted to the first side of the swinging barrier.

13. The exit device assembly of claim 8, wherein the vertically-extending portion is configured to be mounted within the swinging barrier.

14. The exit device assembly of claim 8, wherein the actuator comprises a rotatable handle, and wherein actuation of the actuator comprises rotation of the rotatable handle.

15. A system comprising the exit device assembly of claim 8, the system further comprising the swinging barrier;

wherein the pushbar assembly is mounted to the first side of the swinging barrier at a first height;

wherein the trim assembly is mounted to the second side of the swinging barrier at a second height; and wherein the trim assembly is vertically offset from the pushbar assembly by the offset distance.

16. A system for restricting access through a swinging barrier, the system comprising:

an elongated horizontally-extending pushbar assembly mounted to a first side of a swinging barrier, the pushbar assembly comprising a latch control assembly and an elongated horizontally-extending pushbar operable to actuate the latch control assembly;

a trim assembly mounted to a second side of the swinging barrier, the trim assembly comprising a manual actuator, wherein the manual actuator is located an offset distance above the pushbar; and a transmission assembly operably connecting the pushbar assembly with the trim assembly such that the latch control assembly actuates in response to actuation of the manual actuator; and wherein the transmission assembly comprises a vertically-extending portion that traverses at least a portion of the offset distance, and wherein the vertically-extending portion is positioned at a location other than the second side of the swinging barrier; and wherein the offset distance is configured to discourage a child from reaching the manual actuator.

17. The system of claim 16, wherein the location other than the second side of the swinging barrier is the first side of the swinging barrier.

18. The system of claim 16, wherein the location other than the second side of the swinging barrier is the within the swinging barrier.

19. The system of claim 16, wherein the vertically-extending portion comprises a flexible cable.

20. The system of claim 16, wherein the vertically-extending portion comprises a rigid rod.

21. The method of claim 1, wherein the pushbar extends along a longitudinal axis; and wherein the latchbolt is configured to retract in a direction of the longitudinal axis.

22. The method of claim 21, wherein the longitudinal axis is a horizontal axis that extends along the first side of the swinging barrier.

23. The method of claim 1, wherein the swinging barrier is mounted for pivotal movement relative to a frame.

24. The method of claim 1, wherein the latchbolt is positioned on the first side of the swinging barrier.

* * * * *